United States Patent
Sun et al.

(10) Patent No.: US 8,119,089 B2
(45) Date of Patent: Feb. 21, 2012

(54) METHOD FOR MANUFACTURING IRON SILICIDE NANO-WIRES

(75) Inventors: Hai-Lin Sun, Bei-Jing (CN); Kai-Li Jiang, Bei-Jing (CN); Qun-Qing Li, Bei-Jing (CN); Shou-Shan Fan, Bei-Jing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 623 days.

(21) Appl. No.: 12/291,320

(22) Filed: Nov. 6, 2008

(65) Prior Publication Data

US 2011/0008237 A1    Jan. 13, 2011

(30) Foreign Application Priority Data

Apr. 3, 2008 (CN) .......................... 2008 1 0066398

(51) Int. Cl.
*C01B 21/068* (2006.01)
(52) U.S. Cl. ...................... 423/344; 423/324
(58) Field of Classification Search .................. 423/344, 423/346, 347, 324
See application file for complete search history.

(56) References Cited

FOREIGN PATENT DOCUMENTS

| JP | 58-7821 | 1/1983 |
|---|---|---|
| JP | 2003-26497 | 1/2003 |
| JP | 2004-83343 | 3/2004 |
| JP | 2004-99392 | 4/2004 |

OTHER PUBLICATIONS

C. Klam et al. "Chemical vapour deposition of silicon onto iron: influence of silicon vapour phase source on the composition and nature of the coating" Journal of Materials Science, Dec. 1991, vol. 26, p. 4945-4952.
Seiji Motojima et al. "Vapour-Phase Siliconizing of Iron Plate and Crystal Growth of FeSi2 Using Si2Cl6 as a Source of Silicon" Journal of Crystal Growth, Dec. 1987, vol. 85, p. 309-317.

*Primary Examiner* — Edward Johnson
(74) *Attorney, Agent, or Firm* — Altis Law Group, Inc.

(57) ABSTRACT

A method for making iron silicide nano-wires comprises the following steps. Firstly, providing an iron object and a growing device, and the growing device comprising a heating apparatus and a reacting room. Secondly, placing the iron object into the reacting room. Thirdly, introducing a silicon-containing gas into the reacting room. Finally, heating the reacting room to a temperature of 600~1200° C.

19 Claims, 5 Drawing Sheets

METHOD FOR MANUFACTURING IRON SILICIDE NANO-WIRES

BACKGROUND

1. Technical Field

The present invention relates to methods for making nano materials and, particularly, to a method for making an iron silicide (FeSi) nano-wires.

2. Discussion of Related Art

Iron silicide (FeSi) is a narrow-bandgap semiconductor with a cubic structure, which can be applied in the field of Spintronics (Spin Electronics) due to its unusual magnetic behavior. Therefore, achieving various iron silicide (FeSi) nano-wires is desirable.

A conventional method of making iron silicide (FeSi) nano-wires according to prior art includes the following steps. Firstly, providing a silicon substrate as a growing substrate, a quantity of anhydrous $FeCl_3$ powder (boiling point 319° C.) and an alumina boat. Secondly, placing the silicon substrate and anhydrous $FeCl_3$ powder separately in the alumina boat, and then placing the alumina boat into a horizontal-tube furnace. The $FeCl_3$ powder is placed between the gas inlet of the horizontal-tube furnace and the silicon substrate. Thirdly, introducing a $N_2$ gas into the horizontal-tube furnace. Finally, heating the horizontal-tube furnace to a temperature of 1100° C. The $FeCl_3$ powder is vaporized when the temperature is above 319° C. The vapor-phase $FeCl_3$ was carried by the $N_2$ to reach the silicon substrate and reacts with the silicon substrate to grow iron silicide nano-wires. The iron silicide nano-wires are along the [111] direction and distributed disorderly on the surface of the silicon substrate.

However, there are some drawbacks in using this method. Firstly, high temperature is needed, usually above 1100° C., to grow iron silicide nano-wires, which consumes a lot of energy and is costly. Secondly, costly growing substrates are required to grow iron silicide nano-wires.

What is needed, therefore, is a method for making the iron silicide nano-wires efficient and effective manner.

BRIEF DESCRIPTION OF THE DRAWINGS

Many aspects of the present method for making the iron silicide nano-wires can be better understood with references to the following drawings. The components in the drawings are not necessarily drawn to scale, the emphasis instead being placed upon clearly illustrating the principles of the present method for making the iron silicide nano-wires.

Figure 1:
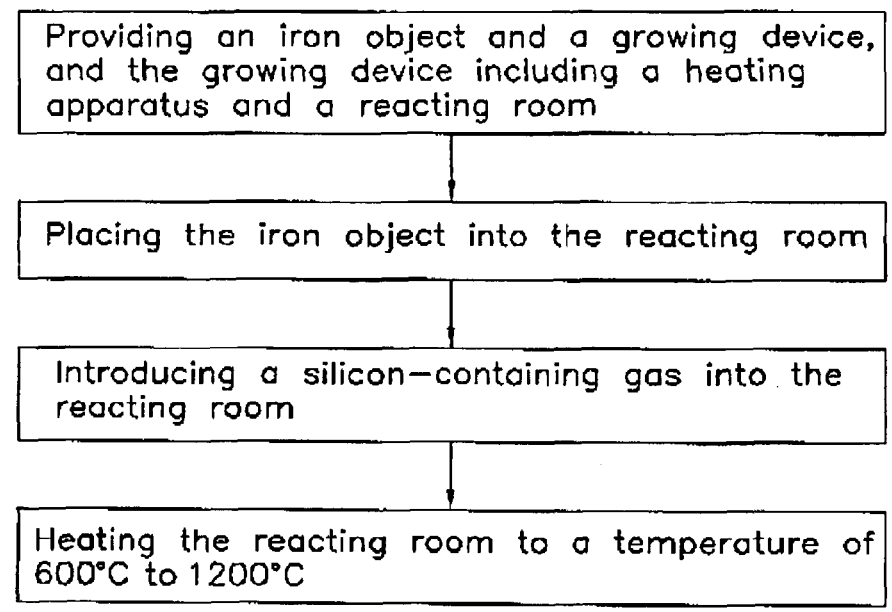
FIG. 1 is a flow chart of a method for making an iron silicide nano-wires, in accordance with a present embodiment.

Corresponding reference characters indicate corresponding parts throughout the several views. The exemplifications set out herein illustrate at least one embodiment of the present method for making the iron silicide nano-wires, in at least one form, and such exemplifications are not to be construed as limiting the scope of the invention in any manner.

DETAILED DESCRIPTION

References will now be made to the drawings to describe, in detail, various embodiments of the present method for making an iron silicide nano-wires.

Figure 2:
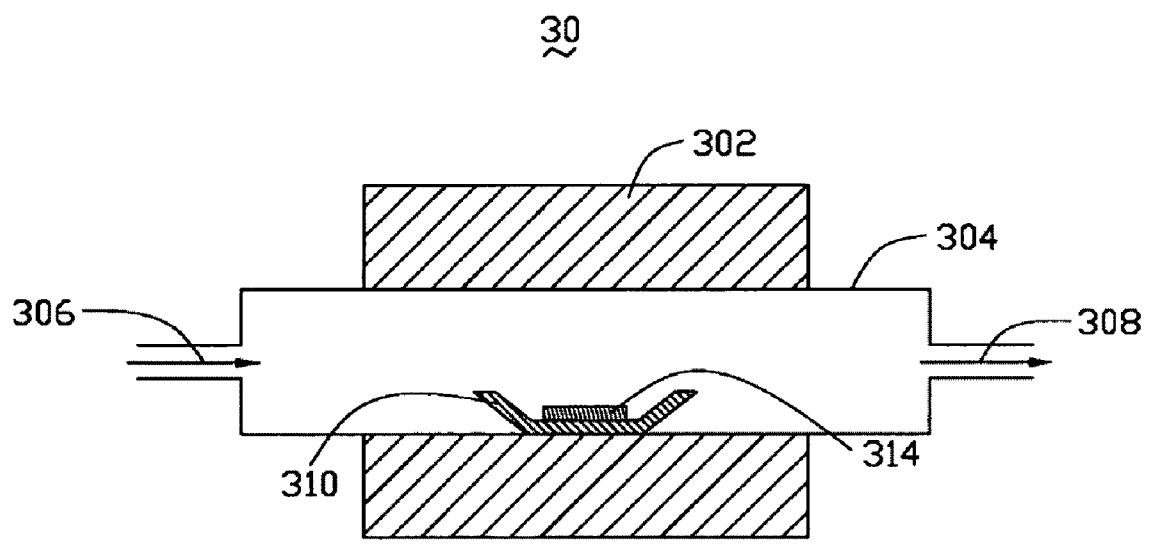
FIG. 2 is a schematic view of a growing device used for making the iron silicide nano-wires of FIG. 1.

Referring to FIGS. 1 and 2, a method for making the iron silicide nano-wires includes the following steps: (a) providing an iron object 314 and a growing device 30 that includes a heating apparatus 302 and a reacting room 304; (b) placing the iron object 314 into the reacting room 304; (c) introducing a silicon-containing gas into the reacting room 304; and (d) heating the reacting room to a temperature of 600~1200° C.

In step (a), the reacting room 304 can be a quartz tube with a gas inlet 306 at one end and a gas outlet 308 at an opposite end. The quartz tube is movably located in the heating apparatus 302. The length of the quartz tube is more than the length of the heating apparatus 302 so that part of the tube can be used a handle when moving it while still keeping a substantial part of it heated in the heating apparatus 302.

Moreover, a carrier 310 with a high melting point can be disposed in the reacting room 304. In the present embodiment, the carrier 310 is a ceramic boat. The shape of ceramic boat is arbitrary and the volume thereof can be selected according to need.

In step (a), the size and shape of the iron object 314 is arbitrary and can be selected according to need. The purity of the iron object 314 is more than 99.9%. In the present embodiment, the iron object 314 is an iron plate. Before placing the iron object 314 into the reacting room 304, the iron object 314 is treated by a diluted acid solution for a period of time (e.g. from about 2 to 10 minutes) to remove any oxide layer present and other impurities on the surface of the iron object 314. In the present embodiment, the diluted acid solution is diluted hydrochloric acid solution. A layer of iron chloride will form on the surface of the iron object 314 after dipping in the diluted hydrochloric acid. The layer of iron chloride is easy to be vaporized so that the surface activity of the iron object 314 is increased.

In step (b), the iron object 314 may be placed anywhere in the reacting room 304 as long as one surface of the iron object 314 can be exposed to the silicon-containing gas introduced in the following step (c). In the present embodiment, the iron object 314 can be placed out of the carrier 310 or in the carrier 310. The iron silicide nano-wires can be fabricated directly on a surface of the iron object 314.

Before step (c), an optional step (e) of introducing a protective gas into the reacting room 304 may be carried out. The protective gas is used to evacuate the atmospheric air in the reacting room 304. The flow rate of the protective gas ranges approximately from 200 to 2000 milliliter per minute. The protective gas is selected from a group comprising nitrogen ($N_2$) gas and noble gases. In the present embodiment, the protective gas is argon (Ar) gas.

Before step (c) and after step (e), an optional step (f) of introducing a hydrogen gas into the reacting room 304 and heating the reacting room 304 to a temperature of 600~800° C. may be carried out. The protective gas is still added during the introduction of the hydrogen gas. The air pressure in the reacting room 304 ranges approximately from 1 to 15 torrs. The purity of the hydrogen gas is more than 99.99%. The flow rate of the hydrogen gas ranges approximately from 20 to 1000 milliliters per minute. The period of time for introducing the hydrogen gas ranges approximately from 10 to 20 minutes. The hydrogen gas is used to reduce any iron oxide formation on the surface of the iron object 314. It is to be understood that the process of introducing the hydrogen gas into the reacting room 304 may be carried out before or after heating the reacting room 304 or at the same time as heating the reacting room 304.

In step (c), the silicon-containing gas is introduced into the reacting room 304 after the hydrogen gas is introduced for about 10 minutes. The protective gas and hydrogen gas is still added during the introduction of the silicon-containing gas. The air pressure in the reacting room 304 ranges approximately from 1 to 20 torrs. The silicon-containing gas can be selected from the group comprising silicon halide, silane, silane derivative, halogenated silane and combination thereof. The flow rate of the silicon-containing gas ranges approximately from 10 to 1000 milliliters per minute. In the present embodiment, the silicon-containing gas is silicon tetrachloride ($SiCl_4$) gas and the flow rate of the silicon-containing gas is 100 milliliters per minute.

In step (d), the reacting temperature ranges approximately from 600 to 1200° C. The rate the temperature increases in the reacting room 304 is 20° C. per minute. The period of time for growing the iron silicide nano-wires ranges approximately from 30 to 120 minutes. The vapor-phase Fe reacts with the silicon-containing gas to fabricate iron silicide nano-wires on the iron object 314.

Figure 3:
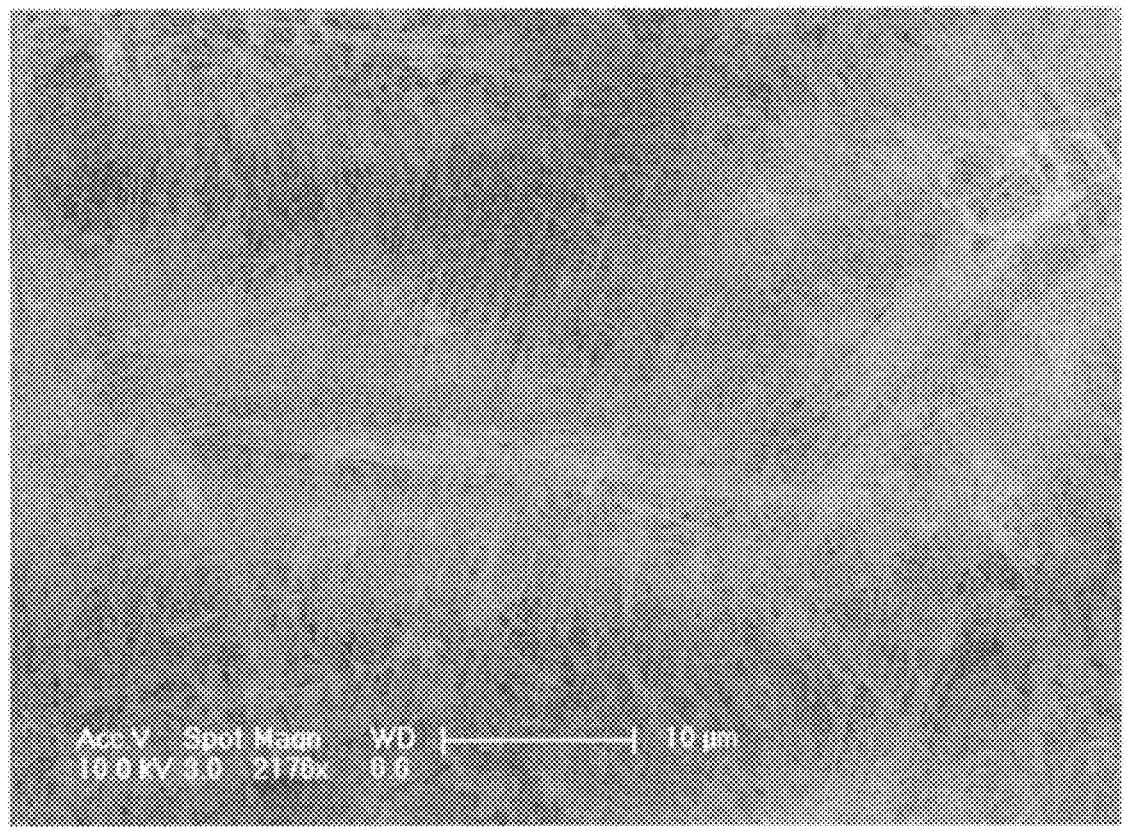
FIG. 3 is a Scanning Electron Microscope (SEM) image of the iron silicide nano-wires formed by the method of FIG. 1.
Figure 4:
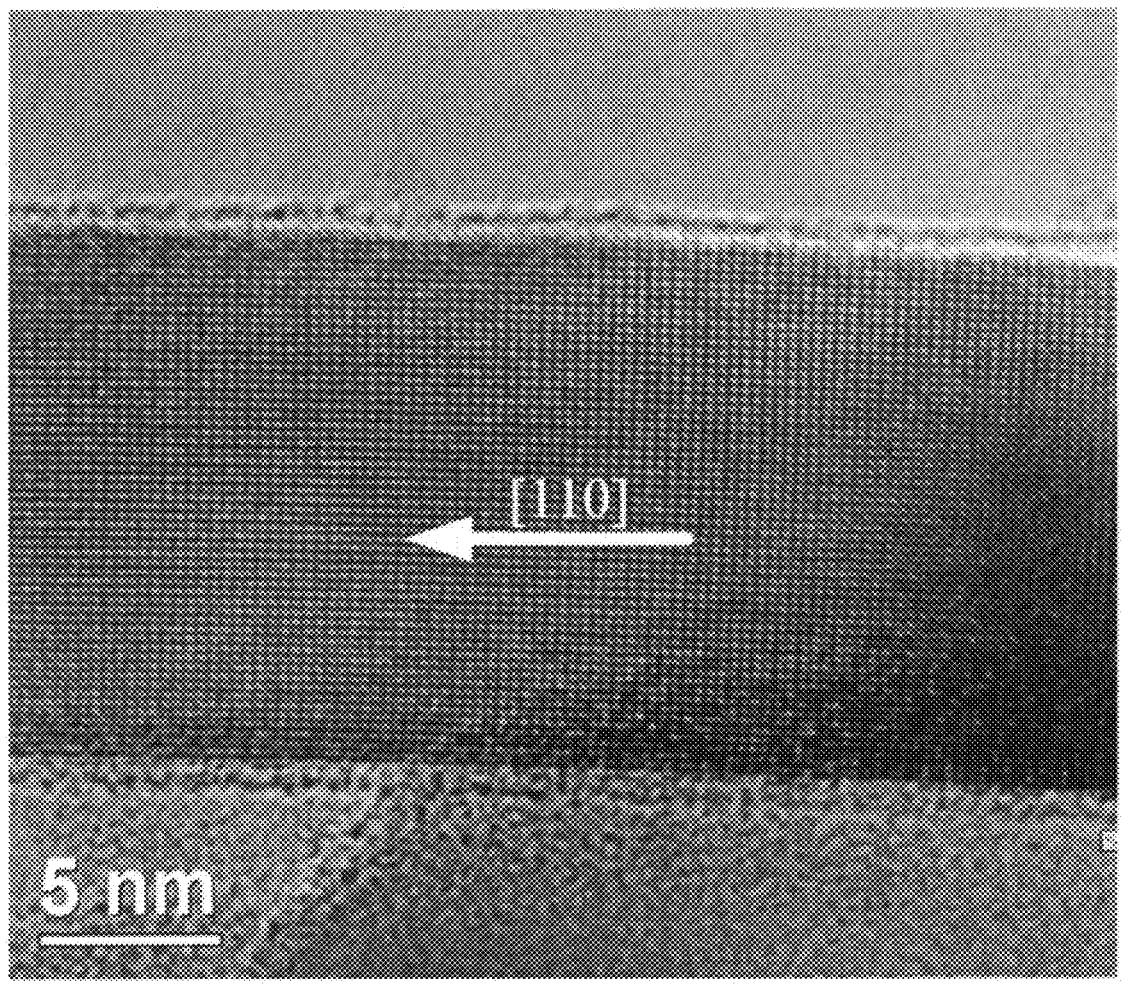
FIG. 4 is a Transmission Electron Microscope (TEM) image of the iron silicide nano-wires formed by the method of FIG. 1.
Figure 5:
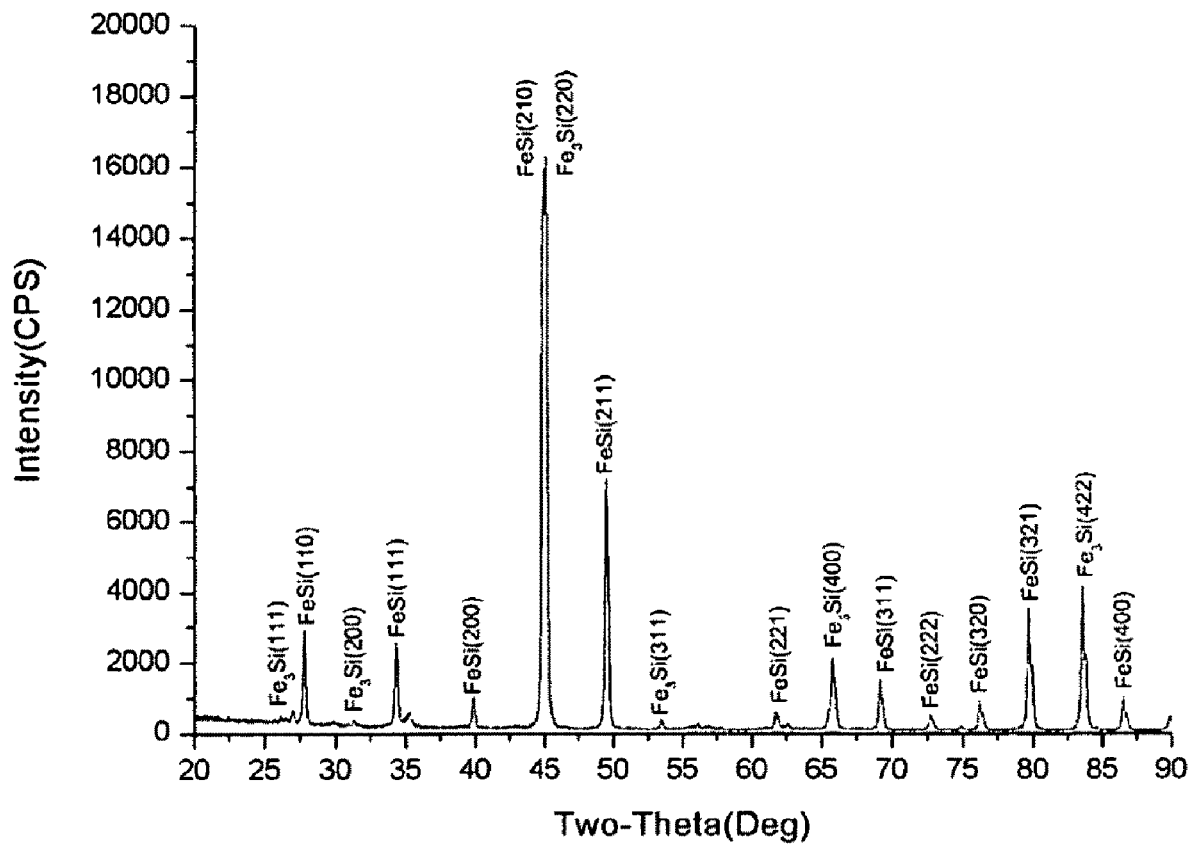
FIG. 5 is an X-Ray Diffraction (XRD) result of the iron silicide nano-wires formed by the method of FIG. 1.

In the present embodiment, the iron silicide nano-wires are fabricated at a temperature of 800° C. Referring to FIG. 3, the iron silicide nano-wires in the present embodiment are disorderly distributed on the iron object 314. Diameters of the iron silicide nano-wires range approximately from 10 to 500 nanometers. Lengths of the silicide nano-wires range approximately from 100 nanometers to 100 micrometers. Referring to FIG. 4, the silicide nano-wires are along [110] direction. Referring to FIG. 5, the XRD result show that the iron silicide nano-wires fabricated at a temperature of 800° C. include $Fe_3Si$ phase and FeSi phase. The iron silicide nano-wires fabricated at a temperature below 1000° C. include $Fe_3Si$ phase and FeSi phase, but the iron silicide nano-wires fabricated at a temperature above 1000° C. includes only FeSi phase. It is because the Fe atoms in $Fe_3Si$ are easily diffused to the surface of the $Fe_3Si$ crystal lattice at temperatures above 1000° C. and react with the silicon-containing gas to fabricate iron silicide nano-wires in FeSi phase.

The present method for making the iron silicide nano-wires has many advantages. Firstly, the iron object can react with the silicon-containing gas at a low temperature, therefore saving energy and reducing costs. Secondly, the method can further reduce costs by allowing fabrication of the iron silicide nano-wires directly on the iron object.

It is to be understood that the above-described embodiments are intended to illustrate, rather than limit, the invention. Variations may be made to the embodiments without departing from the spirit of the invention as claimed. The above-described embodiments illustrate the scope of the invention but do not restrict the scope of the invention.

It is also to be understood that the above description and the claims drawn to a method may include some indication in reference to certain steps. However, the indication used is only to be viewed for identification purposes and not as a suggestion as to an order for the steps.

What is claimed is:

1. A method for making iron silicide nano-wires, the method comprising the following steps of:
    (a) providing an iron object and a growing device, and the growing device comprising a heating apparatus and a reacting room;
    (b) placing the iron object into the reacting room;
    (c) introducing a silicon-containing gas into the reacting room; and
    (d) heating the reacting room to a temperature of 600~1200° C.

2. The method as claimed in claim 1, wherein the iron object is an iron plate.

3. The method as claimed in claim 1, wherein the purity of the iron object is more than 99.9%.

4. The method as claimed in claim 1, wherein the iron object are treated by a diluted acid solution for about 2 to 10 minutes before being placed into the reacting room.

5. The method as claimed in claim 4, wherein the diluted acid solution is diluted hydrochloric acid solution.

6. The method as claimed in claim 1, further comprising (e) supplying a protective gas into the reacting room before step (c).

7. The method as claimed in claim 6, wherein there is a flow rate of the protective gas, and the flow rate of the protective gas ranges from 200 to 2000 milliliter per minute.

8. The method as claimed in claim 6, wherein the protective gas is selected from a group comprising nitrogen gas, noble gas, and any combination thereof.

9. The method as claimed in claim 1, wherein in step (c) the air pressure in the reacting room ranges from 1 to 20 torrs.

10. The method as claimed in claim 1, wherein the silicon-containing gas is selected from the group comprising silicon halide, silane, silane derivative thereof, halogenated silane and combinations thereof.

11. The method as claimed in claim 10, wherein the silicon halide is silicon tetrachloride.

12. The method as claimed in claim 1, wherein the flow rate of the silicon-containing gas ranges from 10 to 1000 milliliters per minute.

13. The method as claimed in claim 1, wherein the rate the temperature increases in the reacting room is 20° C. per minute.

14. The method as claimed in claim 1, wherein a time for growing the iron silicide nano-wires ranges from 30 to 120 minutes.

15. A method for making iron silicide nano-wires, the method comprising the following steps of:
    providing an iron object and a growing device, and the growing device comprising a heating apparatus and a reacting room;
    placing the iron object into the reacting room;
    introducing a hydrogen gas and a silicon-containing gas into the reacting room; and
    heating the reacting room to a temperature of 600~800° C.

16. The method as claimed in claim 15, wherein the purity of the hydrogen gas is more than 99.99%.

17. The method as claimed in claim 15, wherein the flow rate of the hydrogen gas ranges from 20 to 1000 milliliters per minute.

18. The method as claimed in claim 15, wherein the period of time for introducing the hydrogen gas ranges from 10 to 20 minutes.

19. The method as claimed in claim 15, further comprising heating the reacting room to a temperature of 800~1200° C.

* * * * *